United States Patent [19]

Brown

[11] Patent Number: 5,733,016
[45] Date of Patent: Mar. 31, 1998

[54] WHEEL RIM BALANCE WEIGHT MOUNTING

[76] Inventor: Trevor J. Brown, 2140 Avoncrest Dr., Rochester Hills, Mich. 48309

[21] Appl. No.: 682,941

[22] Filed: Jul. 16, 1996

Related U.S. Application Data

[63] Continuation-in-part of Ser. No. 820,312, Aug. 28, 1995, abandoned.

[51] Int. Cl.$^6$ ............................................. B60B 1/00
[52] U.S. Cl. ............................................. 301/5.21
[58] Field of Search ............................................. 301/5.21

[56] References Cited

U.S. PATENT DOCUMENTS

| | | | |
|---|---|---|---|
| 2,714,039 | 7/1955 | Pouell | 301/5.21 |
| 3,890,008 | 6/1975 | Lejeune | 301/5.21 |
| 4,379,596 | 4/1983 | Green et al. | 301/5.21 |

FOREIGN PATENT DOCUMENTS

| | | | |
|---|---|---|---|
| 1087030 | 8/1960 | Germany | 301/5.21 |
| 1505857 | 8/1970 | Germany | 301/5.21 |

*Primary Examiner*—Russell D. Stormer
*Attorney, Agent, or Firm*—John R. Benefiel

[57] ABSTRACT

A mar-free mounting for a wheel balance weight has a clip cast into the weight, the clip having a U-shaped portion fit over a wheel rim flange. A convexly curved hemmed edge is formed at the leading edge of the clip which moves into a complementary groove formed in the surface of the wheel rim flange when the clip is installed. The hemmed edge is configured to wedge into the groove, establishing an increased circumferential frictional force and a high locking force which is primarily relied on to secure the weight. Installation and removal thus involve only modest contact loads, which together with the effect of the hemmed edge being smoothly curved at either end prevent marring of painted or clear coated wheel surfaces.

7 Claims, 4 Drawing Sheets

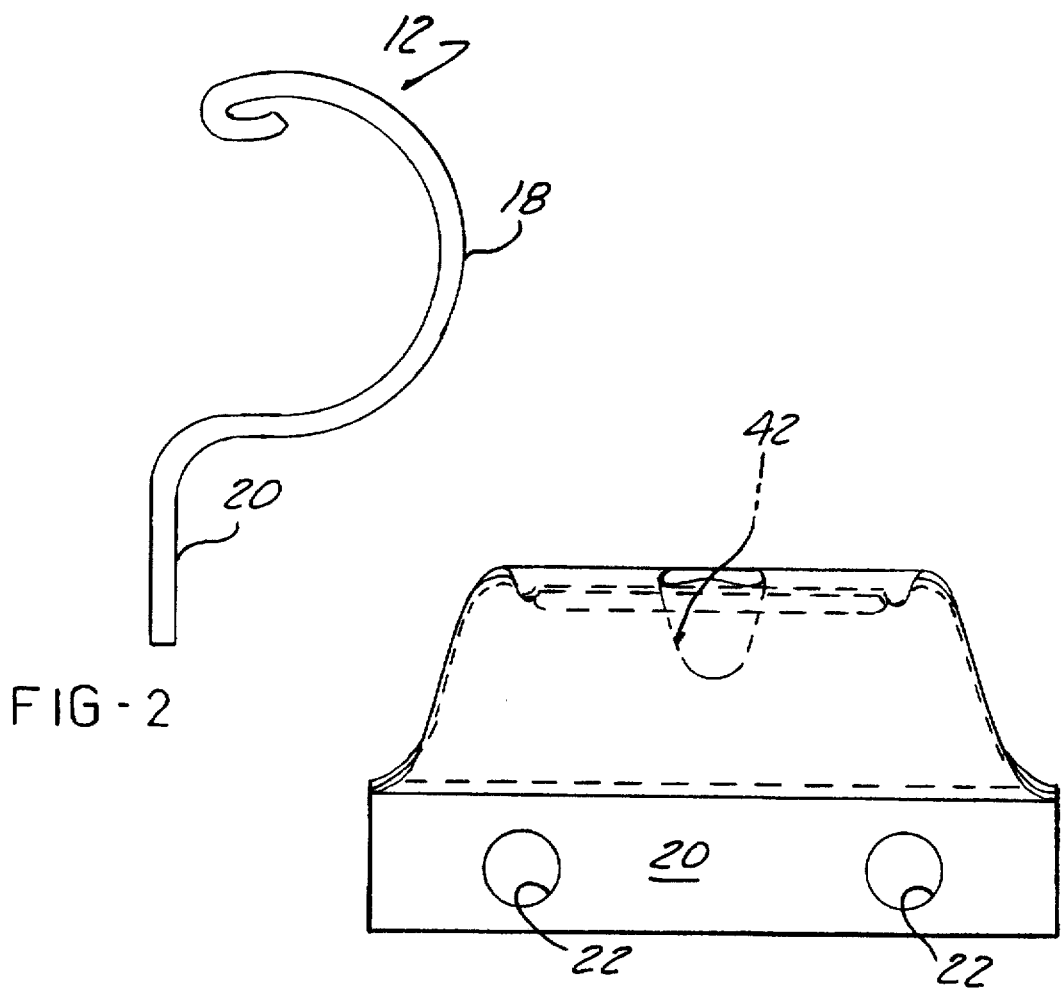
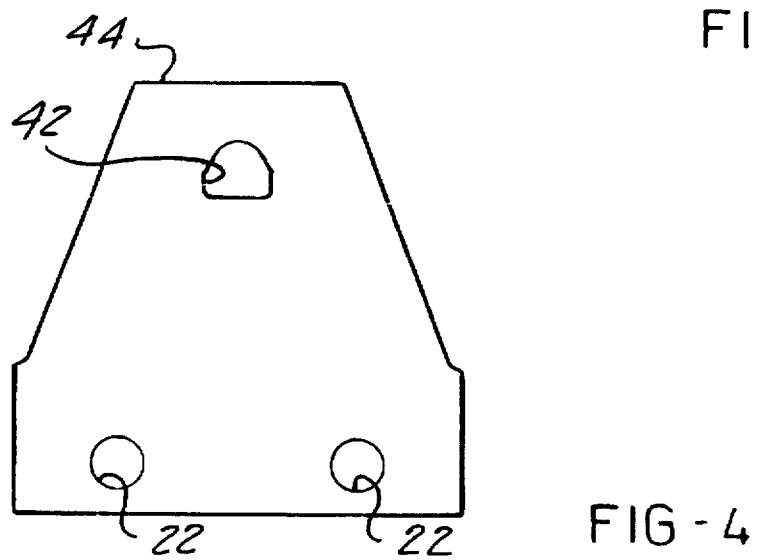

WHEEL RIM BALANCE WEIGHT MOUNTING

CROSS-REFERENCE TO RELATED APPLICATION

This application is a continuation-in-part of U.S. Ser. No. 08/520,312, filed on Aug. 28, 1995, now abandoned.

BACKGROUND OF THE INVENTION

This invention concerns balance weight mountings for automobile wheels.

It is necessary to install weights on the rims of vehicle wheels to achieve proper balance of the wheel and tire in order to prevent vibrations which could otherwise occur at certain vehicle speeds.

These weights comprise lead pieces attached to the wheel rim at variable locations determined for each wheel during the balancing process.

One widely used mounting comprises a spring steel clip having its stem cast into a lead weight. A rim gripping portion comprises a hook—shaped clip portion which passes around an out-turned flange on the wheel rim when installed. The length of the clip necessary to achieve adequate gripping force results in the end of the clip often being wedged into a space between the flange and the tire, which causes difficulties in installing the weight.

The clip is hammered into place once the proper location on the rim has been determined by use of wheel balancing equipment.

The use of this type of mounting has led to changes in wheel design in order to insure adequate security of the mounting.

The out-turned wheel rim flange has been extended so as to create a larger gripping feature for the clip, and to confine the lead weight at its outer perimeter so that the lead weight will be positioned lying against a wheel sidewall and completely under the out-turned flange.

In order to further improve retention, the clip has heretofore been formed with a retention barb, comprising an inwardly extending projection stamped into the outer leg of the clip. The retention barb conventionally has a sharp edge which digs into the surface of the wheel flange in order to increase the holding power of the clip.

Chrome plated surfaces are too hard for the barb to penetrate, and recently a barb groove has been added to the wheel rim to receive the barb when the clip is fully seated.

With the introduction of aluminum wheels which have decorative surface finishes, such as a vacuum metallized surface, chrome plating, painting, etc., the use of a long leg clip has become disadvantageous in that installation and removal causes marring of the decorative surface, particularly by the dragging of the clip barb during removal.

The long-legged clip and increased width flange position the clip leading edge against the outer face of the flange at a steep angle when positioned preparatory to installation, so as to create severe surface marring as the clip is hammered in position during installation.

The clip and flange geometry also requires excessive deflection of the clip to install, resulting in yielding of the clip and creating looseness sufficient to prevent reuse of the clip and weight.

The manner of engagement of this type clip with the tire has prevented automation of the installation process by the automobile manufacturers. Such automated installation of the balance weight would reduce labor cost in the manufacturing plant.

Another problem encountered is circumferential migration of the weight out of its installed position, this shift caused by tire loading in the footprint area, resulting in engagement of the tire sidewall with the clip in such a manner as to force the clip to shift from its installed position. This in turn causes an unbalanced wheel condition to redevelop. This occurs if insufficient retention friction force is available to resist such migration.

If the clip gripping force is increased, as by stiffening the clip, failure of paint or clear coat wheel finishes in compression may result as the clip is installed and removed.

Some clip designs allow nonmarring installation but have a sharp edge which mars the finish when the clip is removed.

The object of the present invention is to provide an improved mounting for wheel balance weights which greatly minimizes the tendency for marring of the wheel surfaces when the weights are either installed or removed, while providing secure retention of the weights against shifting along the wheel perimeter induced by tire sidewall pressure.

It is another object of the present invention to provide such mounting using a clip which is minimally deflected during installation and removal to avoid permanent bending thereof, and which is adapted to automated or easier manual installation during production.

SUMMARY OF THE INVENTION

These and other objects of the present invention which will become apparent upon a reading of the following specification and claims are achieved by a mounting using a clip having a U-shaped portion, with one end cast into the lead weight. The leading end of the free end of the clip is hemmed to create a locking feature having a convex bottom contour rounded at each end which will not mar the folded back edge of the surface during either installation or removal of the weight, the hemmed and feature preferably coined to insure a smooth rounded contour that will not gouge the paint finish during removal.

The deformation and maximum pressure required to install the weight is kept to moderate levels to prevent compression failure of surface finishes, such as paint or clear coat.

In order to prevent shifting of the weight despite using only moderate gripping pressure, the hemmed and feature is wedgingly fit into a retention groove in the wheel rim increasing the friction between the hemmed end feature and the wheel rim surfaces to in turn insure that the weight remains in position and resists shifting by tire loading.

The wedging fit is achieved by sizing the radius of the hemmed edge to be slightly larger than the groove, producing two lines of contact of the hemmed edge on either side of the retention groove.

DESCRIPTION OF THE DRAWINGS

FIG. 2 is a side view of the clip shown in FIG. 1.

FIG. 3 is a front view of the clip shown in FIG. 2.

FIG. 4 is a plan view of a blank used to form the clip shown in FIGS. 2 and 3.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
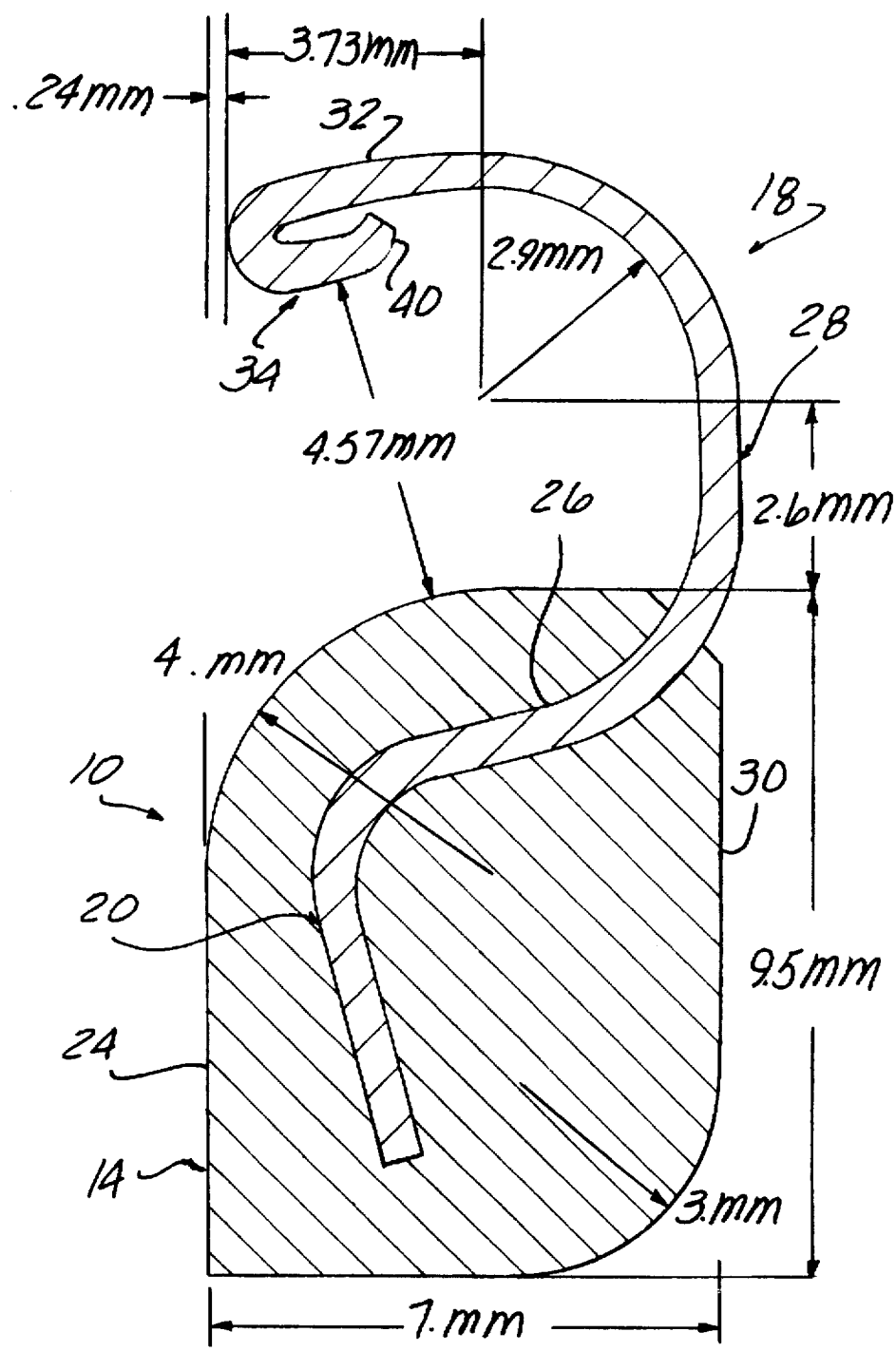
FIG. 1 is a sectional view of a balance weight and cast-in mounting clip according to the present invention.

Referring to the drawings and particularly FIG. 1, the balance weight assembly 10 according to the present invention comprises a mounting clip 12 cast into the lead weight 14.

The lead weight 14 is of conventional design, typically arcuately shaped to conform to the inside of a wheel rim flange.

The mounting clip 12 is constructed of spring steel such as SAE 1050, austempered to Rc 42-48, and is configured with a generally U-shaped portion 18 and a flat anchoring portion 20. The U-shaped portion 18 has a pair of generally parallel legs 26 and 32 joined at one end by a connection section 28, lower leg 26 cast into the lead weight 14. The anchoring portion 20 is formed with a pair of punched holes 22 (FIG. 3) which keys the clip 12 to the weight 14 when the clip is cast into the weight 14. The anchoring portion 20 is tilted with respect to the inner face 24 of the weight 14 to better center the clip in the lead weight 14. This also encloses the lower leg 26 of the U-shaped portion 18, while locating the connection section 28 of the U-shaped portion 18 adjacent the outside face 30 of the weight 14.

The resultant tilted orientation of the clip U-shaped portion 18 also tends to pull the weight towards the corner of the wheel rim flange (FIG. 5) and against the radial face 51 of the wheel 49.

The upper leg 32 has a free end terminated by a hemmed feature 34 comprised of the end thereof folded back underneath the remaining portions of the leg 32. The feature thus formed has smooth rounded contour at the leading and trailing ends thereof.

The inner corner 40 of edge of the the folded back end is preferably coined to be inclined towards the upper leg to insure that only a smoothly rounded trailing surface bears on the wheel rim surface during removal of the balance weight assembly 10.

A hole 42 is provided for insertion of a removal tool (not shown).

In order to provide more uniform stress levels, the clip U-shaped portion 18 is tapered as seen in FIG. 3 to increase in width from a minimum width at the leading end, resulting in more efficient use of the material from which the clip is made.

The minimum width which will provide sufficiently low pressure to avoid compression failure of paint and clear coatings has been determined to be approximately 12.7 mm, and hence this is the preferable dimension of the hemmed leading end 44 of the blank shown in FIG. 4. This width is adequate when the clip 12 is constructed as shown, with an 0.6 mm thickness of spring steel.

FIGS. 1-4 show the dimensions in millimeters and other parameters of an embodiment of a clip constructed according to the invention.

Figure 5:
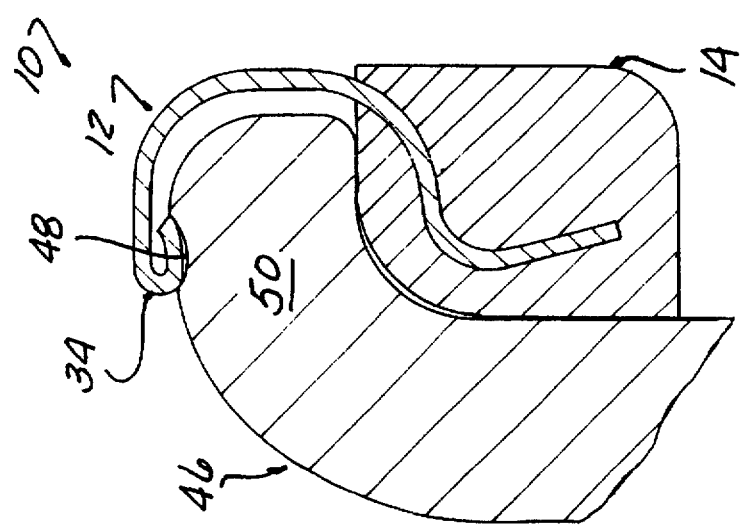
FIG. 5 is a sectional view of a weight and clip according to the invention installed on a wheel rim, shown in fragmentary form.

FIG. 5 shows the balance weight assembly 10 installed on a wheel 46, with the hemmed and feature 34 wedged into an annular groove 48 formed in the outside surface of the out-turned wheel rim flange 50.

Figure 6:
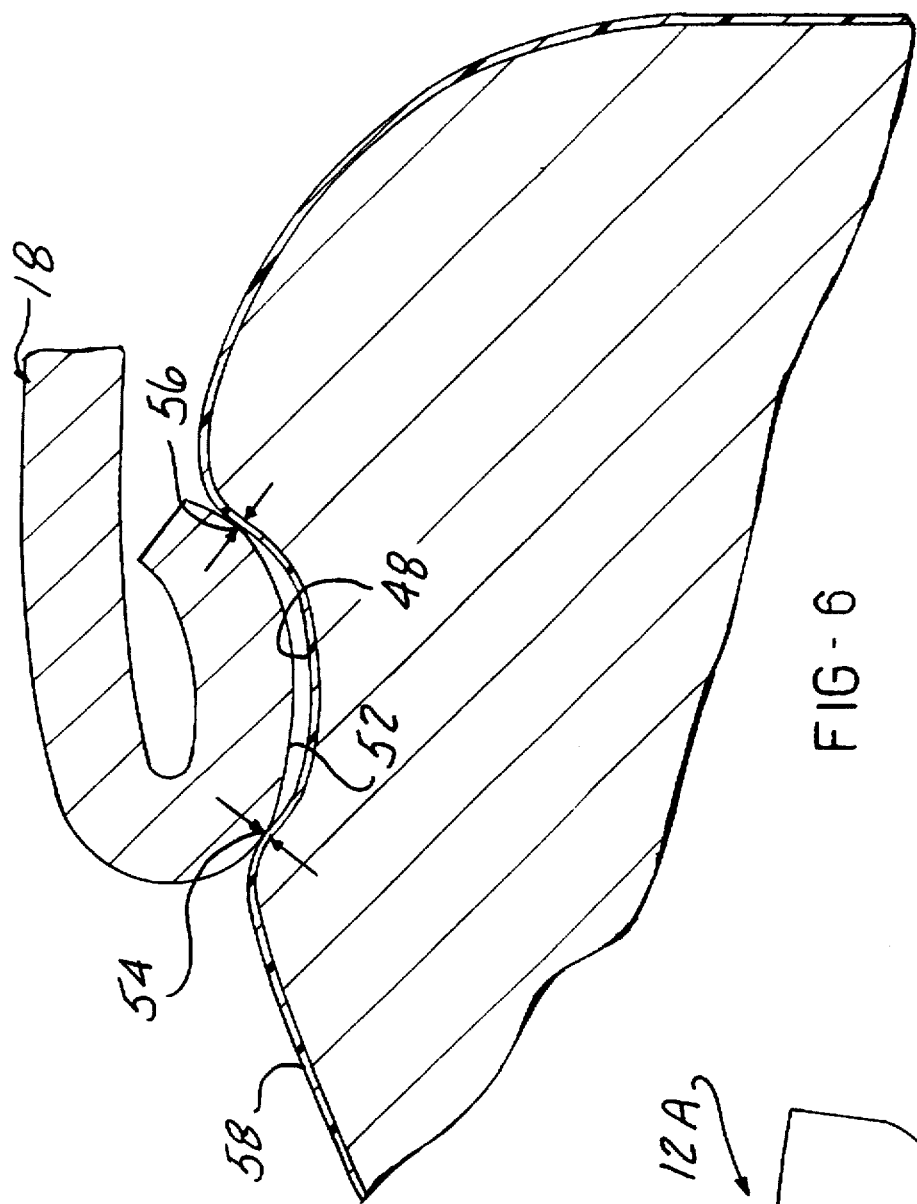
FIG. 6 is an enlarged view of a portion of the clip and wheel rim shown in FIG. 5.

As best seen in FIG. 6, the radius of the inner surface 52 of the hemmed end feature 34 is slightly greater than the groove 48 such that rather than resting within the groove 48, a pair of line contacts (at 54, 56) with the wheel coating layer 58 are established between the surface 52 and the sides of the groove 48.

This engagement results in a wedging action increasing the contact pressure between the hemmed end feature 34 and groove 48 over the gripping pressure applied due to the angle of the contact pressure. This geometry thereby increases the retention friction by means of the inclined plane force multiplication effect, allowing the contact force to be relatively moderate when the clip is installed and removed.

This arrangement allows mar-free installation and removal of the assembly even for painted or clear coated surfaces.

Figure 7:
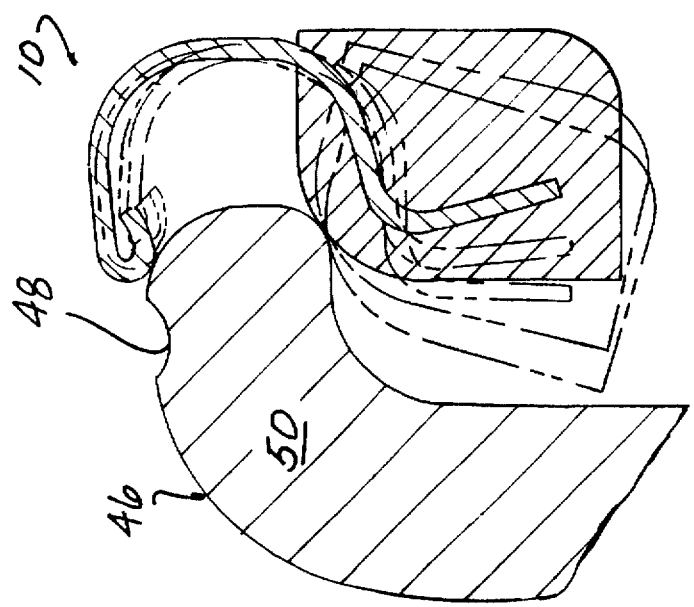
FIG. 7 is a diagram of the weight, clip, and rim shown in a range of various entry inclinations which are possible for successful installation.

The smooth surfaces of the clip 12 allows the assembly 10 to be tilted or advanced straight in at installation as indicated in FIG. 7, thus facilitating automation of the installation process.

Figure 8:
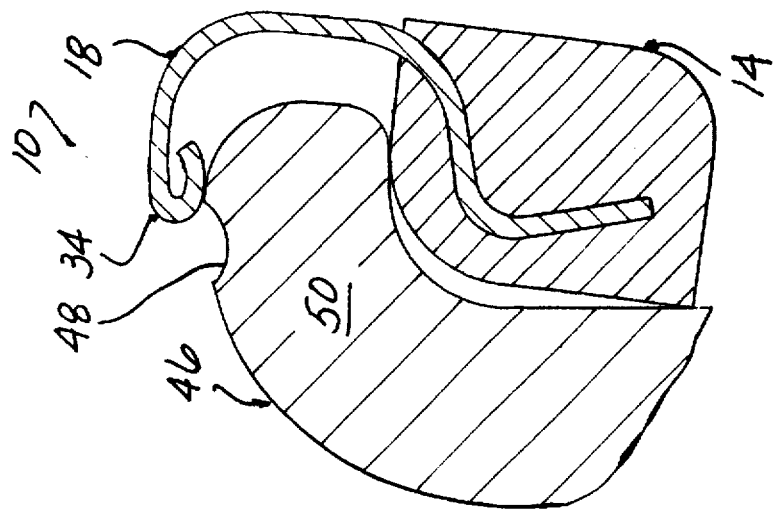
FIG. 8 shows in section the weight and clip being installed on a wheel rim, at a point of maximum deflection of the clip.

FIG. 8 illustrates that only modest deflection of the U-shaped portion 18 is required, i.e., 1.5 mm, such that taken with the effect of having smoothly rounded contact surfaces, paint or clear coat finishes will not be marred.

Even less deflection (0.56 mm) will exist once the hemmed end feature 34 is seated in the radiused groove 48, but due to the wedging engagement described above, the retention force resisting movement of the assembly 10 will be adequate.

It is critical that the clip 12 be cast square to the cast weight 14 so that the undersurface 52 of the hemmed end feature 34 will be flat to the wheel rim surface.

Figure 9:
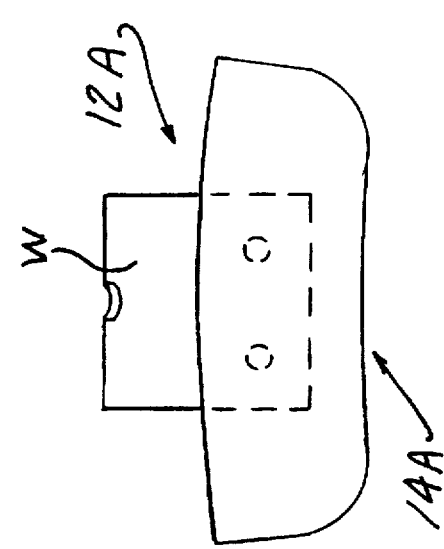
FIG. 9 is a perspective view of a balance weight assembly of a configuration used for light balance weights.

For very light weights, i.e., one-quarter ounce or less, the clip 12A can be of uniform width, i.e., 12.7 mm as shown in FIG. 9.

The wedging action between the hemmed end feature and the groove is primarily relied on to maintain location of the clip, allowing reduced forces during installation and removal. The convex curvature of the hemmed end feature undersurface with no sharp at either end contributes to insuring mar-free installation and removal.

I claim:

1. A mounting for attaching a wheel balance weight to a wheel, said wheel having a radial face and an out-turned wheel rim flange, said out-turned wheel rim flange having a groove concavely curved across the width thereof extending around the perimeter of said wheel rim flange comprising:

a clip having a generally U-shaped portion formed by a pair of generally parallel legs and a connecting section Joining one end of each leg, said clip fixedly secured to said wheel balance weight by one of said legs cast into said weight, said connecting section projecting out of said weight and the other of said legs of said clip U-shaped portion configured to be snap fit onto said out-turned wheel rim flange;

said other leg of said clip having a retention feature comprised of an opposite hemmed end of said other leg lying outside of said weight, said hemmed end configured to have a convex surface interfit into said groove formed into said wheel rim flange when said clip portion is snap fit onto said wheel rim flange, said hemmed end of said other leg formed by a portion of said other leg folded back under overlying portions of said other leg, said hemmed end having a terminal edge formed to extend towards said other leg overlying portions, so that said hemmed end convex surface is smoothly curved across the width thereof, said convex surface further having a portion adjacent said terminal edge smoothly curving away from said groove with said convex surface interfit into said groove to position said terminal edge away and completely out of contact with surfaces defining said groove, whereby said balance weight is held against said radial face of said wheel and within said flange, retained by said interfit retention feature.

2. The mounting according to claim 1 wherein said convexly curved inner surface of said hemmed end is of a greater radius than said concavely curved groove so as to establish line contact therebetween on either side of said groove.

3. The mounting according to claim 1 wherein said clip has a flat anchoring portion integral with said clip U-shaped portion, said anchoring portion cast into said balance weight together with said one leg to be fixedly secured thereto.

4. The mounting according to claim 3 wherein flat sides are formed on said weight extending away from said other leg, said gas anchoring portion having a straight section inclined with respect to said flat sides of said balance weight.

5. The mounting according to claim 1 wherein said clip U-shaped portion is tapered, having a narrower width at said hemmed end of said other leg than the width of said remaining portions of said clip U-shaped portion.

6. The mounting according to claim 2 wherein said terminal edge of said hemmed end is coined to round the edge thereof.

7. A mounting for attaching a wheel balance weight to a wheel, said wheel having a radial face and an out-turned wheel rim flange, said out-turned wheel rim flange having a groove concavely curved across the width thereof and extending around the perimeter of said wheel rim flange comprising:

a clip having a generally U-shaped portion formed by a pair of legs and a connecting section, said clip fixedly secured to said wheel balance weight, said clip U-shaped portion configured to be snap fit onto said out-turned wheel rim flange; a retention feature on an end of said clip U-shaped portion configured to be interfit into said groove formed into said wheel rim flange when said clip portion is snap fit onto said wheel rim flange, said retention feature comprised of a hemmed end of said clip formed by an outer end thereof folded back under overlying portions of said clip, said hemmed end having a terminal edge formed to extend towards said overlying clip portions, so that said hemmed end has an inner convex surface smoothly curved across the width thereof, said convexly curved inner surface of said hemmed end of a greater radius than said concavely curved groove so as to establish line contact therebetween on either side of said groove, whereby said balance weight is held against said radial face of said wheel and within said flange, retained by said interfit retention feature.

\* \* \* \* \*